United States Patent
Jalluri et al.

(10) Patent No.: US 7,383,097 B2
(45) Date of Patent: Jun. 3, 2008

(54) METHOD FOR MANAGING MACHINE TOOL DATA

(75) Inventors: Chandra Jalluri, Canton, MI (US); Prashanth Magadi, Ypsilanti, MI (US); Ingrid Kaufman, Eden Praire, MN (US)

(73) Assignee: Ford Motor Company, Dearborn, MI (US)

( * ) Notice: Subject to any disclaimer, the term of this patent is extended or adjusted under 35 U.S.C. 154(b) by 146 days.

(21) Appl. No.: 11/161,377

(22) Filed: Aug. 1, 2005

(65) Prior Publication Data

US 2006/0089744 A1    Apr. 27, 2006

Related U.S. Application Data

(63) Continuation-in-part of application No. 10/904,119, filed on Oct. 25, 2004.

(51) Int. Cl.
*G06F 19/00* (2006.01)

(52) U.S. Cl. .................... 700/174; 700/159
(58) Field of Classification Search ......... 700/174, 700/159, 280, 175; 702/179
See application file for complete search history.

(56) References Cited

U.S. PATENT DOCUMENTS

| | | | |
|---|---|---|---|
| 4,723,219 A | 2/1988 | Beyer et al. | |
| 4,816,731 A | 3/1989 | Boulton et al. | |
| 4,985,857 A | 1/1991 | Bajpai et al. | |
| 5,119,318 A | 6/1992 | Paradies et al. | |
| 5,127,005 A | 6/1992 | Oda et al. | |
| 5,181,898 A | 1/1993 | Piotrowski | |
| 5,339,257 A | 8/1994 | Layden et al. | |
| 5,407,265 A | 4/1995 | Hamidieh et al. | |
| 5,663,894 A * | 9/1997 | Seth et al. | 702/56 |
| 5,672,230 A | 9/1997 | Park et al. | |
| 5,719,479 A | 2/1998 | Kato et al. | |
| 5,857,166 A | 1/1999 | Kim | |
| 5,896,292 A | 4/1999 | Hosaka et al. | |
| 5,937,405 A | 8/1999 | Campbell | |
| 6,161,051 A | 12/2000 | Hafemann et al. | |
| 6,217,496 B1 | 4/2001 | Lindem | |
| 6,240,451 B1 | 5/2001 | Campbell et al. | |
| 6,289,735 B1 | 9/2001 | Dister et al. | |
| 6,324,659 B1 | 11/2001 | Pierro | |
| 6,338,003 B1 | 1/2002 | Kamiguchi et al. | |
| 6,442,444 B2 | 8/2002 | Matsubara et al. | |
| 6,470,377 B1 | 10/2002 | Sevcik et al. | |
| 6,484,109 B1 | 11/2002 | Lofall | |
| 6,496,789 B2 | 12/2002 | Seth et al. | |
| 6,587,744 B1 | 7/2003 | Stoddard et al. | |
| 6,615,103 B2 | 9/2003 | Fujishima et al. | |
| 6,643,592 B1 | 11/2003 | Loman et al. | |

(Continued)

*Primary Examiner*—Paul Rodriguez
*Assistant Examiner*—Steven R. Garland
(74) *Attorney, Agent, or Firm*—Raymond L. Coppiellie; Brooks Kushman P.C.

(57) ABSTRACT

A method for managing machine tool data includes operating the machine tool to perform at least a portion of an operation cycle which includes a non-machining operation. Data is processed from signals output from at least one sensor and from a controller to define a non-machining operation-specific data profile for the non-machining operation. An algorithm is applied to the non-machining operation-specific data profile to generate a non-machining operation-specific data point, which facilitates generation of a non-machining operation-specific trend line used to help determine the health of the machine tool.

20 Claims, 6 Drawing Sheets

U.S. PATENT DOCUMENTS

| | | |
|---|---|---|
| 6,697,894 B1 | 2/2004 | Mitchell et al. |
| 6,731,995 B2 | 5/2004 | Takeuchi |
| 6,738,748 B2 | 5/2004 | Wetzer |
| 6,741,265 B2 | 5/2004 | Ghosh et al. |
| 6,845,340 B2 | 1/2005 | Edie et al. |
| 6,882,961 B2 | 4/2005 | Cobble et al. |
| 6,909,990 B2 | 6/2005 | Okazaki et al. |
| 6,947,797 B2 | 9/2005 | Dean et al. |
| 6,954,680 B2 | 10/2005 | Kreidler et al. |
| 7,054,761 B2 | 5/2006 | Lindberg et al. |
| 7,168,351 B2 | 1/2007 | Hirayama et al. |
| 7,200,774 B2 | 4/2007 | Vollmar et al. |
| 2001/0049325 A1 | 12/2001 | Katoh et al. |
| 2002/0010991 A1 | 1/2002 | Muscarella et al. |
| 2002/0017139 A1 | 2/2002 | Kluft et al. |
| 2002/0129653 A1 | 9/2002 | Seth et al. |
| 2002/0138171 A1 | 9/2002 | Fukutani |
| 2002/0198686 A1 | 12/2002 | Hu et al. |
| 2003/0046436 A1 | 3/2003 | Govindaraj et al. |
| 2003/0103827 A1 | 6/2003 | Moller et al. |
| 2003/0212766 A1 | 11/2003 | Giles et al. |
| 2004/0176926 A1* | 9/2004 | Edie et al. .................. 702/179 |
| 2004/0193307 A1 | 9/2004 | Fujishima et al. |
| 2005/0097405 A1 | 5/2005 | Sesek et al. |
| 2005/0160847 A1 | 7/2005 | Walter |
| 2005/0218192 A1 | 10/2005 | Lovin et al. |
| 2005/0262236 A1 | 11/2005 | Schachtely et al. |
| 2006/0089742 A1* | 4/2006 | Jalluri et al. ................. 700/174 |
| 2006/0089743 A1* | 4/2006 | Jalluri et al. ................. 700/174 |
| 2007/0067678 A1 | 3/2007 | Hosek et al. |

* cited by examiner

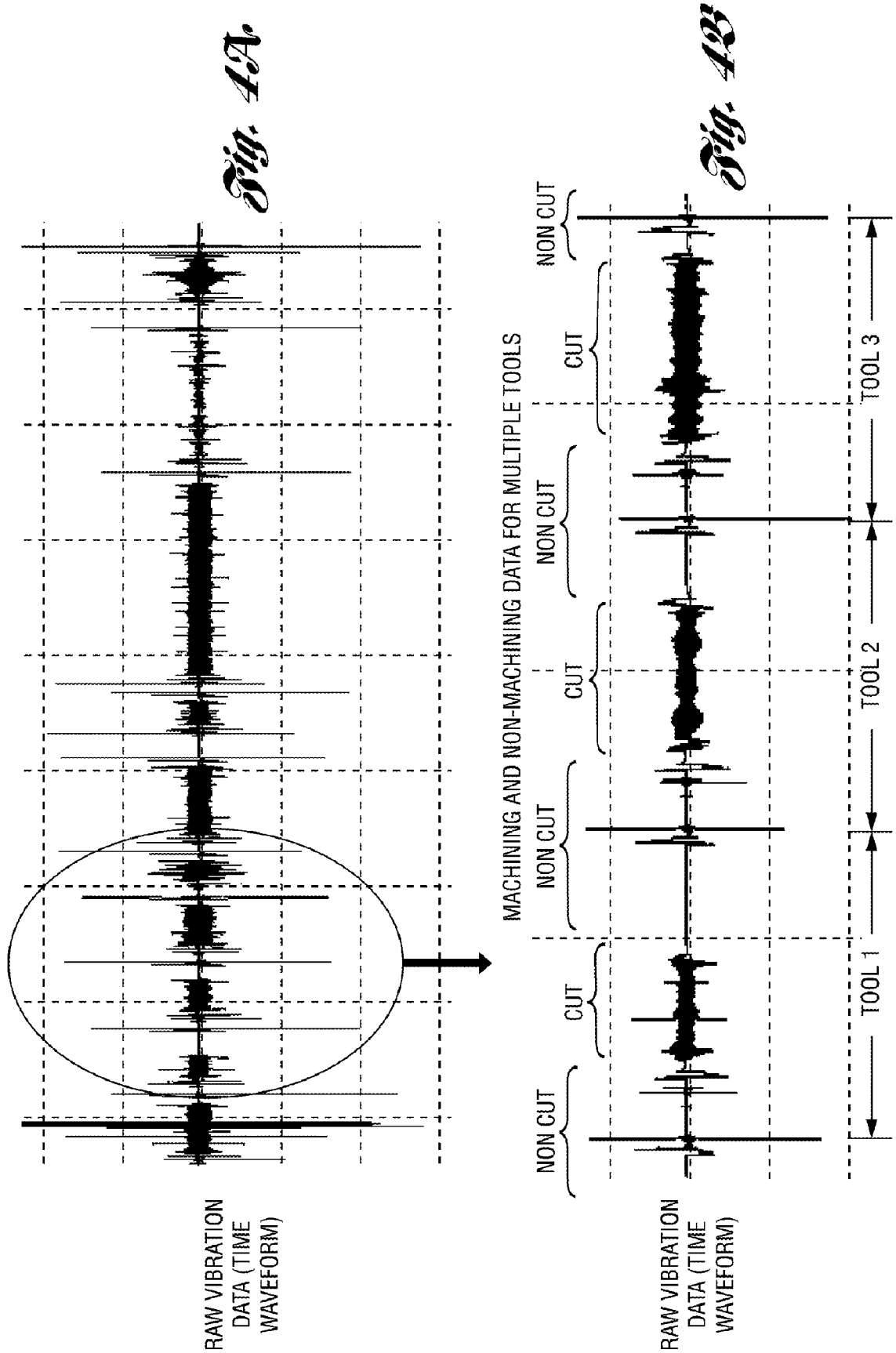

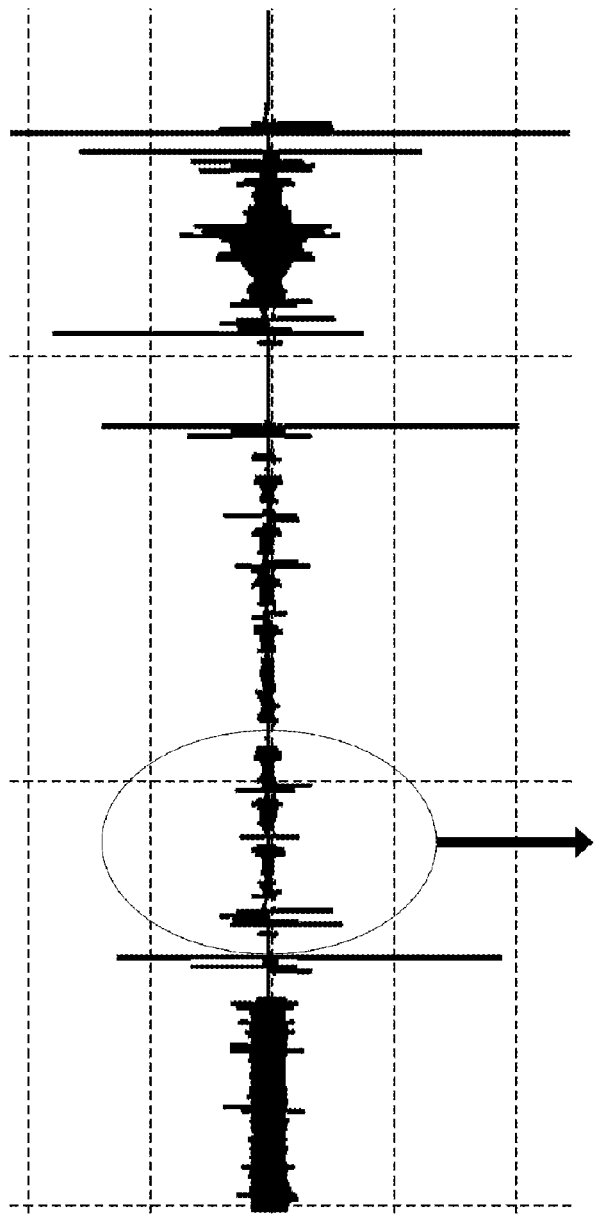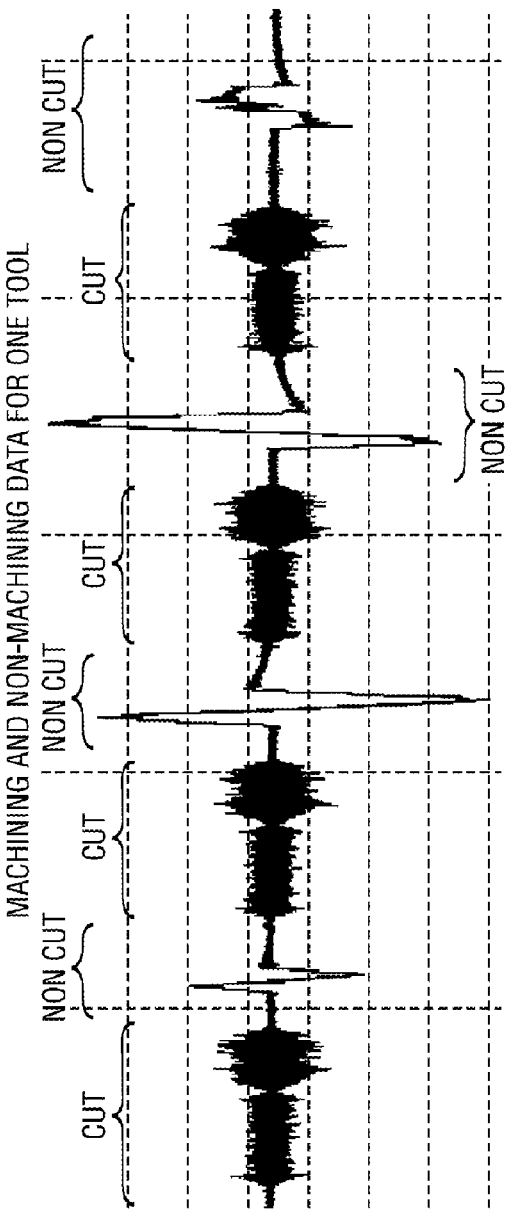

METHOD FOR MANAGING MACHINE TOOL DATA

CROSS-REFERENCE TO RELATED APPLICATIONS

This application is a continuation-in-part of U.S. application Ser. No. 10/904,119 filed Oct. 25, 2004, which is hereby incorporated herein by reference.

BACKGROUND OF THE INVENTION

1. Field of the Invention

The present invention relates to a method for managing machine tool data.

2. Background Art

The ever-increasing emphasis on product quality continues to put pressure on manufacturers to find new ways to produce high quality products without increasing production time or otherwise increasing manufacturing costs. Inherent in this high quality, low cost dichotomy is a need to reduce scrap, while obtaining the longest possible life from manufacturing tools and equipment. Thus, increasing the number of tooling changes and/or decreasing the time between machine tool maintenance may increase product quality, but it may result in an unnecessary increase in tooling costs and/or lost production time.

Over time, manufacturers have developed systems and methods of predictive and preventative maintenance. Such systems may include a scheduled tool change based on a number of parts produced, or scheduled machine down time, during which bearings and other components may be replaced prior to their having an adverse effect on product quality. In order to implement these systems in a cost effective manner, or to reduce the frequency of these preventative maintenance tasks, decision-makers need information. In particular, information that is indicative of historical trends is useful, so that accurate predictions can be made regarding future production runs. In addition, the ability to isolate particular problem areas is also useful; this helps to concentrate efforts where they will have the most impact and produce the most benefit.

Toward this end, manufacturers have continued to analyze machine tools and their associated components in an effort to gather information they can use to make efficacious decisions regarding their production systems and processes. One type of machine tool analysis used is a vibration analysis. Information gathered from this type of analysis may be indicative of a variety of different production problems.

One system and method of characterizing a machining process using vibrational signatures of machines is described in U.S. Pat. No. 5,663,894, issued to Seth et al. on Sep. 2, 1997. Seth et al. describes characterizing the vibrational signatures of machines by discriminating vibrational activity at various positions on the machines. This is done both with and without machining loads. Both time and frequency domain analysis may then be stored in a database for future comparison and tracking.

Because a machine tool, during non-machining operations, may see vibrations which are many times higher than those seen during a cutting operation, it may be desirable to isolate non-machining data for separate evaluation from the machining data. This data could then be used as an indicator of the health of the machine tool itself, rather than indicating the health of a particular machining process.

SUMMARY OF THE INVENTION

One advantage of the present invention is that it provides a method for managing machine tool data that isolates non-machining data from machining data, thereby providing an indicator of the health of the machine tool.

The invention also provides a method for managing machine tool data, where the machine tool is operable to perform at least one operation cycle which includes at least one machining operation and at least one non-machining operation. The machine tool has at least one sensor operatively connected thereto for sensing a machine operation parameter, and further has a controller configured to output data related to the at least one operation cycle. The method includes operating the machine tool to perform at least a portion of an operation cycle which includes a non-machining operation. Data from signals output from the at least one sensor and from the controller are processed to define a non-machining operation-specific data profile for the non-machining operation. An algorithm is applied to the non-machining operation-specific data profile to generate a non-machining operation-specific data point. This facilitates generation of a non-machining operation-specific trend line.

The invention further provides a method for managing machine tool data for a machine tool that is operable to perform at least one operation cycle, including at least one machining operation and at least one non-machining operation. The machine tool has at least one sensor operatively connected thereto for sensing a machine operation parameter. The machine tool also has a controller configured to output data related to the at least one operation cycle. The method includes sensing a machine operation parameter for the machine tool for at least a portion of at least one operation cycle including a plurality of non-machining operations. Data related to the sensed parameter is stored, as is data from signals output from the controller. The data from the sensor is associated with the data from the controller, which facilitates defining corresponding non-machining operation-specific data profiles for at least some of the non-machining operations. An algorithm is applied to at least some of the non-machining operation-specific data profiles to generate corresponding non-machining operation-specific data points. The non-machining operation-specific data points are stored, which facilities their subsequent retrieval.

The invention also provides a method for managing machine tool data, where the machine tool has a controller operatively connected thereto for outputting data related to operation of the machine tool. The method includes performing at least one machining operation, and performing at least one non-machining operation. A machine operation parameter for the machine tool is sensed when it is performing the at least one machining operation and the at least one non-machining operation. The sensed machine operation parameter is associated with data output from the controller, which facilitates defining corresponding machining operation-specific data profiles and non-machining operation-specific data profiles. An algorithm is applied to at least some of the associated data to generate corresponding machining operation-specific data points and non-machining operation-specific data points, which facilitates generation of machining operation-specific trend lines and non-machining operation-specific trend lines.

BRIEF DESCRIPTION OF THE DRAWINGS

FIGS. 4A and 4B show vibration data for a portion of an operation cycle of a machine tool for different cutting tools;

FIGS. 5A and 5B show raw vibration data for a portion of an operation cycle of a machine tool for a single cutting tool.

DETAILED DESCRIPTION OF THE PREFERRED EMBODIMENT(S)

Figure 1:
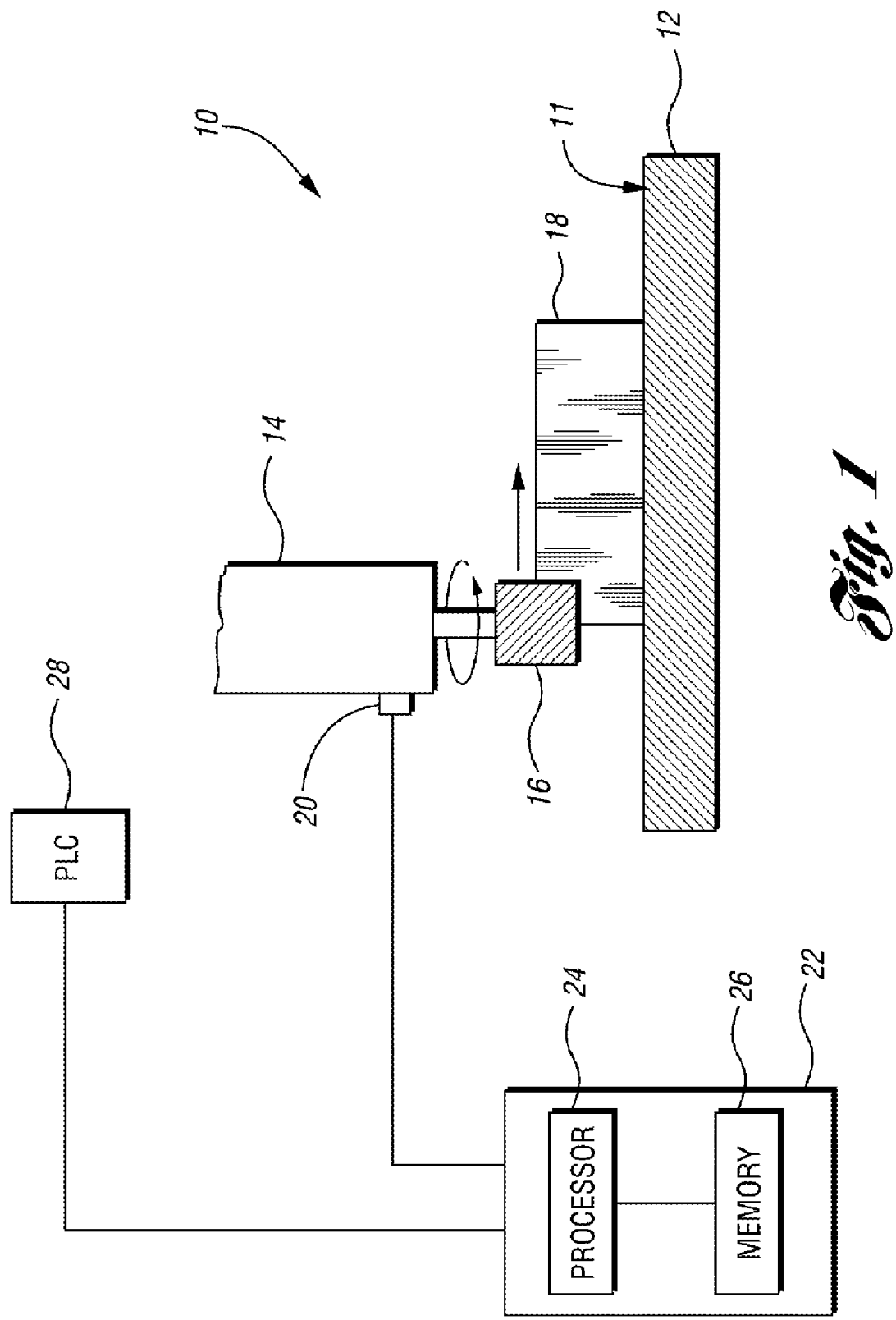
FIG. 1 is a schematic representation of a data management system for a machine tool.

FIG. 1 illustrates a data management system 10 for a machine tool 11. One such data management system is described in U.S. Pat. No. 6,845,340, entitled "System and Method For Machining Data Management," filed on Mar. 6, 2003, which is hereby incorporated herein by reference. The machine tool 11 includes a bed 12 and a spindle 14. The machine tool 11, shown in FIG. 1, is a computer numerical control (CNC) milling machine. As will readily be discerned from the description below, the present invention can be used with virtually any type of machine tool, including manual as well as CNC machines.

Mounted in the spindle 14 is a cutting tool 16 which is used to machine a workpiece 18. Attached to the spindle 14 is a vibration sensor 20 that is configured to sense vibrations in the spindle 14 and output signals related to the vibrations to a processing unit 22. The vibration sensor 20 may be chosen from any one of a number of types of vibration sensors, such as an accelerometer, a velocity sensor, or any other suitable sensor capable of sensing vibrations.

Of course, other types of sensors may be used—i.e., ones that sense machine operation parameters other than vibrations. For example, a current sensor may be used to measure changes in the amount of current the machine tool 11 draws during various operations. Similarly, a thermocouple, or other type of temperature sensor, could be used to detect changes in temperature of some portion of the machine tool 11. The spindle speed, torque, or feed rate could also be sensed to provide information relating to the operations. Indeed, any sensor capable of sensing a machine operation parameter can be used to send signals to the processing unit 22.

The processing unit 22 may be conveniently mounted directly on a portion of the machine tool 11, and includes a processor 24 and a memory 26. The processor 24 may be programmed to perform specific instruction sets on data, such as vibration data received from the sensor 20. A controller, such as a programmable logic controller (PLC) 28, is also attached to the machine tool 11, and may be programmed with information specific to the machine tool 11, or specific to a machining operation, non-machining operation, or operation cycle performed by the machine tool 11. The processor 24 and the memory 26 are both operatively connected to the sensor 20 and the PLC 28, such that data may be transferred among them.

As noted above, the PLC 28 may be programmed with information regarding particular machining and non-machining operations. It is configured to output signals related to the operations to the processing unit 22. For example, if a set of machining operations are being performed on the workpiece 18, and this set of operations is part of an operation cycle, the PLC 28 can, among other things, output signals to the processing unit 22 delineating different portions of the operation cycle. The operation cycle may include machining and non-machining operations, and the PLC 28 can provide a signal whenever machining starts or finishes. As explained below, this allows vibration signals from the sensor 20 to be associated with particular machining and non-machining operations.

The PLC 28 may send a tool pickup signal each time a different tool is used in a set of machining operations. The PLC 28 may also send signals indicating when a particular cutting tool, such as the cutting tool 16, is performing a particular machining operation. In addition, the PLC 28 may communicate to the processing unit 22 when the machine tool 11 is idling, and may further communicate time related data such as the number of machining cycles performed or the number of the workpiece being machined. Thus, by outputting signals related to the machining and non-machining operations, the PLC 28 may communicate to the processing unit 22 tool-specific data, idling data, machining and non-machining data, and time related data, just to name a few. Of course, the specific information output from the PLC 28 to the processing unit 22 may vary, depending on the type and quantity of information desired.

Figure 2:
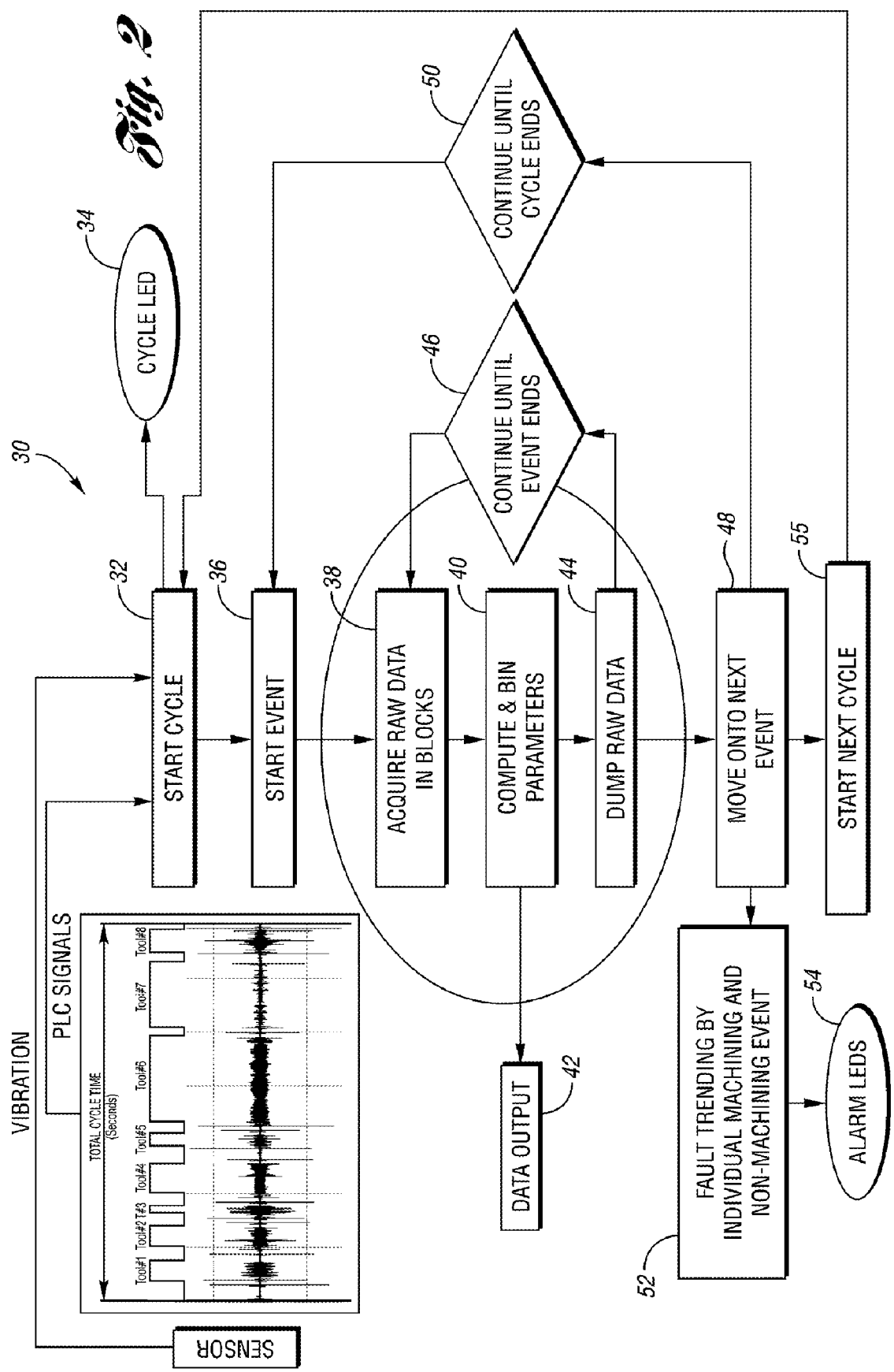
FIG. 2 is a flowchart illustrating an embodiment of a method of the present invention.

FIG. 2 shows a flowchart 30 illustrating one embodiment of a method in accordance with the present invention. At block 32 an operation cycle is started. As noted above, an operation cycle can include both machining and non-machining operations. As shown in FIG. 2, the sensor 20 and the PLC 28 both provide signals which are used in the subsequent data collection. The start of the cycle at block 32 can be indicated by an audible or visual indicator, such as the cycle LED 34, which may be conveniently integrated into the processing unit 22. At block 36, a machining or non-machining operation, or event, is started. At block 38, raw data is acquired, which in the example shown in FIG. 2, includes raw vibration data measured by the sensor 20.

At block 40 an algorithm is applied to the raw vibration data to generate a parametric representation of the vibration data, which is then output at block 42. As noted above, the PLC 28 provides signals which can indicate, among other things, whether the machine tool 11 is within an operation cycle, or outside an operation cycle. In addition, if machine tool 11 is within an operation cycle, the PLC 28 can provide more specific information, such as when the machine tool is performing a machining operation or a non-machining operation.

The PLC 28 can also provide signals indicating when these operations start and stop, which cutting tool is in the spindle 14, and other information about the operations. In this way, the raw data can be associated with the data from the PLC 28 to define machining operation-specific data profiles, and non-machining operation-specific data profiles. Thus, when the parametric representation of the raw data is computed at block 40, the algorithm can be used to generate machining operation-specific data points and non-machining operation-specific data points which can later be used to generate corresponding trend lines for analysis purposes.

The parametric representation of the raw data helps to significantly reduce the size of the data being transferred and stored. The algorithm can be programmed to calculate any of a number of different parametric representations of the raw data. For example, the algorithm may calculate a maximum, a minimum, an average, an average root means square (RMS), a maximum RMS, a minimum RMS, and an RMS summation. Similarly, the algorithm can be programmed to calculate a kurtosis, a kurtosis average, a kurtosis maximum, a kurtosis minimum, a kurtosis standard deviation, and a modified kurtosis formulation. Like the RMS values, the kurtosis values are readily calculated using known statistical formulas, which can be programmed into the algorithm.

At step 44, the raw data is dumped, thereby conserving storage space and bandwidth as the data is transferred. As shown in block 46, the method loops back to block 38 until the particular event is complete. After completion of the particular event, by performing steps 38-46, the process moves on to the next event at step 48. Then the process loops back to blocks 36-50 until all machining and non-machining events are completed in the particular cycle.

Also at step 48, information from the completed machining or non-machining operation can be collected at block 52, where the operation-specific data points can be collected into an operation-specific trend line, which can then be used to analyze the specific operations. In the case of a machining operation, the trend line may provide an indication of the performance of the machining; whereas, in the case of a non-machining operation, the trend line may indicate the health of the machine tool 11 itself, in real time. As described below, an alarm condition can be applied to a trend line, and an indicator provided, such as shown at block 54, to alert an operator that an alarm condition has be reached. After completion of all machining and non-machining events in the particular cycle, the process moves to the next cycle at block 55, and loops back to block 32.

Figure 3:
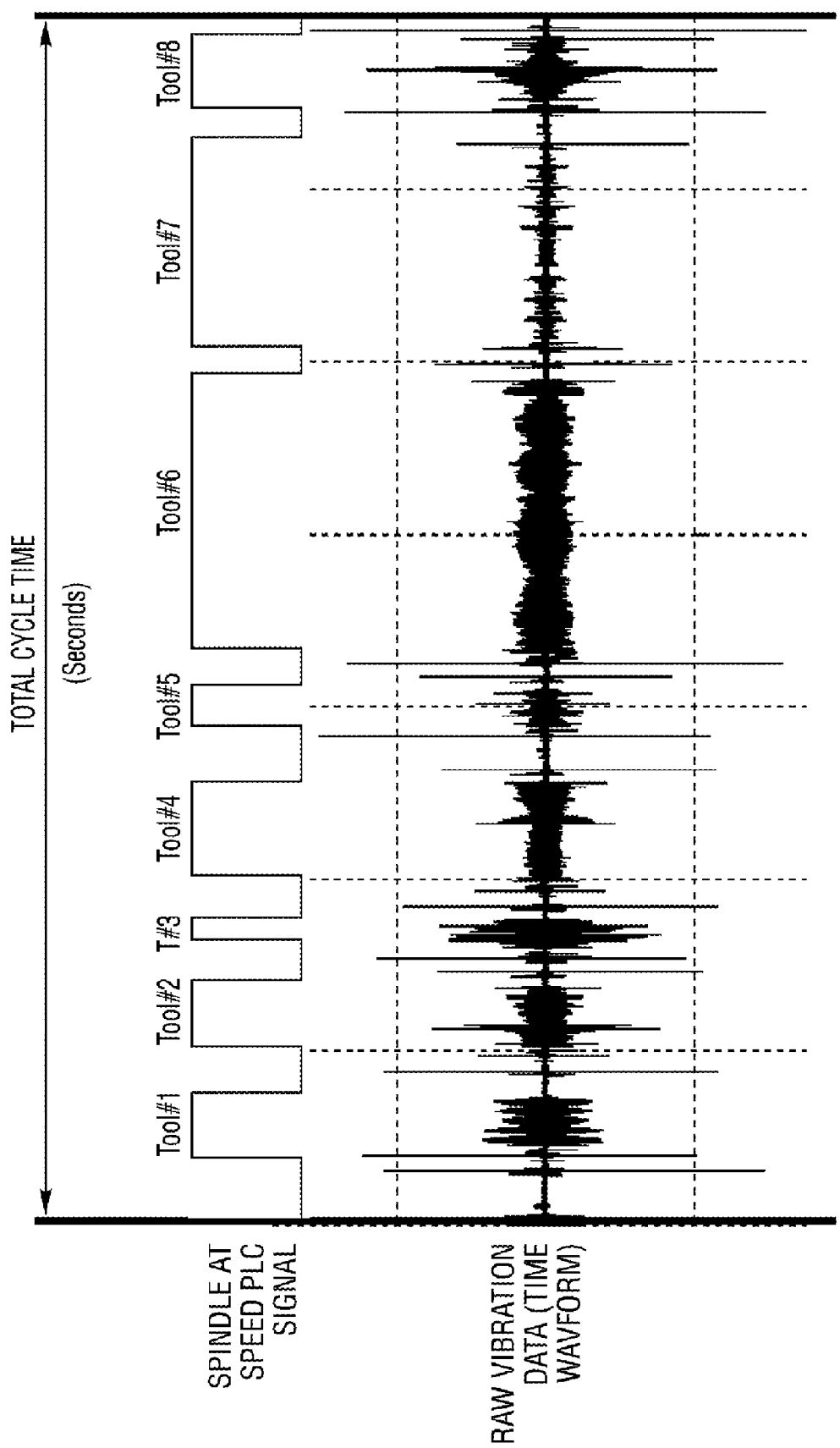
FIG. 3 shows raw vibration data collected from a machine tool for eight different cutting tools and associated cycle events.

As noted above, vibration data can be collected within an operation cycle for both machining operations and non-machining operations. FIG. 3 shows a sample of machining and non-machining operation data and machine operation parameter data that can be collected from a machine tool, such as the machine tool 11 shown in FIG. 1, which is used here for reference. As shown in FIG. 3, this data ranges over an entire operation cycle. The upper portion of FIG. 3 shows a signal provided by the PLC 28 that indicates machining operations performed by eight different tools.

The waveform of the signal provided by the PLC 28 also shows when the machining operation is between tools. These are examples of non-machining operations. During the non-machining operations, the spindle 14 may be accelerating, decelerating, or both. In addition, the cutting tool 16 may be removed from the spindle 14, and replaced with another cutting tool. Other non-machining operations could include rapid feeding of the spindle 14 to position, and part positioning/indexing. Each of these processes constitutes a part of the non-machining operations.

The data collected during the non-machining operations may be particularly important as an indicator of the health of the machine tool 11 itself, including specific portions of the machine tool 11, such as the spindle 14, and the bearings (not shown). The non-machining data may also provide information regarding the cross transmissivity between various slides (not shown) on the machine tool 11. This data provides information regarding how much vibration is transferred from one slide to another as the spindle 14 is being moved. As discussed below, the non-machining operations not only occur during tool changes, but also occur between specific machining operations which take place with the same cutting tool.

FIGS. 4A and 4B provide an additional level of detail for PLC signals and vibration data, such as the data shown in FIG. 3. For example, FIG. 4A shows raw vibration data over the course of an operation cycle for a number of different cutting tools. Again using the machine tool 11 shown in FIG. 1 for reference, FIG. 4B shows a detail of a portion of the raw vibration data broken down into machining operations (cut) and non-machining operations (non cut) for three different cutting tools used in the spindle 14.

As shown in FIG. 4B, the amplitude of the vibrations during the non-machining operations is much higher than the vibrations during the machining operations. This is because the spindle 14 will often move much faster when it is not cutting a workpiece. Moreover, the interaction of the cutting tool 16 and the workpiece 18 may provide stability to the machine tool 11, thereby reducing overall vibrations. This is one of the reasons that tracking the non-machining operations is an important predictor of the health of a machine tool, such as the machine tool 11.

As noted above, it may also be of interest to track machining operations, and non-machining operations for a single cutting tool. FIGS. 5A and 5B illustrate such data. FIG. 5A shows raw vibration data for a portion of an operation cycle, and FIG. 5B isolates a portion of that data for a single cutting tool. As with FIG. 4B, FIG. 5B includes both machining operations (cut) and non-machining operations (non cut). Just as with the non-machining operations occurring during tool changes, the non-machining operations occurring between specific cuts of the same cutting tool also have much higher vibration amplitudes than the measured vibrations during machining operations. The data shown in FIG. 5B could represent, for example, four holes drilled with a single drill bit. Therefore, unlike the data shown in FIG. 4B, the data shown in FIG. 5B includes no tool changes.

As discussed above, application of an algorithm programmed into the processing unit 22 provides a convenient means for reducing the amount of data gathered from the sensor 20. For example, FIG. 4B shows raw vibration data from machining operations and non-machining operations for three different cutting tools. In order to track the health of the machine tool 11, the non-machining operation data can be analyzed by application of the algorithm to output a parametric representation of the vibration data, which can later be plotted as a non-machining operation-specific trend line.

This can be performed in a number of different ways. One method is to combine all of the non-machining operation data regardless of the particular spindle movement or which cutting tool is installed. Thus, for example, all of the non-machining operation data (non cut) shown in FIG. 4B could be combined to generate a single non-machining operation-specific data point for the operation cycle. When other operation cycles are run on the machine tool 11, all of the non-machining operation data for a given operation cycle could be aggregated to output a single point for that operation cycle. The individual points generated for each of the operation cycles could then be plotted on a graph, such as shown in FIG. 6.

Figure 6:
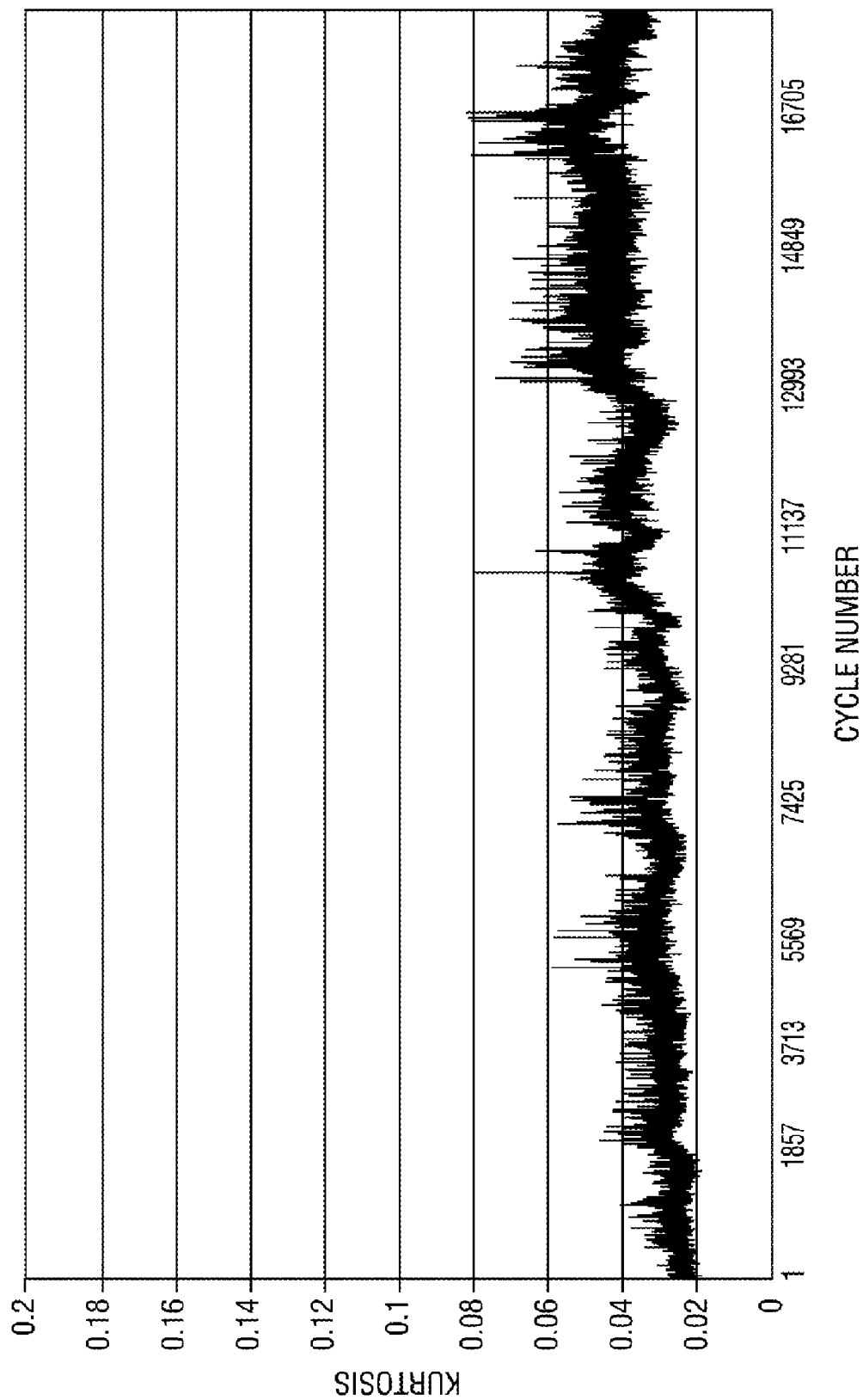
FIG. 6 shows a trend line of a parametric representation of vibration data.

In the example shown in FIG. 6, the parametric representation of the vibration data is a kurtosis, which is shown along the ordinate. Along the abscissa is the cycle number that was performed on the machine tool. The abscissa could also be a time value, or alternatively, could be transformed into a frequency domain. Similarly, a non-machining operation-specific trend line, such as shown in FIG. 6, could be generated for specific cutting tools, or even specific movements of portions of the machine tool, such as the spindle 14 on the machine tool 11.

Using FIG. 5B as an example, each of the non-machining portions of the data (non cut) represent movement of the spindle 14 between cutting operations for the same cutting tool. Rather than aggregating all of the non-machining operation data for an entire operation cycle, the non-machining operation data for a single cutting tool could be combined and output into a trend line, such as shown in FIG. 6. This would provide a manufacturing manager with an even greater level of detail than aggregating by operation cycle.

Another way in which a non-machining operation-specific trend line may be generated, is to choose a particular non-machining operation, such as an acceleration of the spindle 14. This particular non-machining operation—e.g., the spindle acceleration—could have vibration data collected on it for a number of different operation cycles. For each of the different operation cycles, a single data point could be generated from only the spindle acceleration data. In this way, the data points could be combined and plotted to generate a trend line, such as the trend line shown in FIG. 6. Such a trend line would then represent a very specific non-machining operation analyzed over many cycles. This is another way in which a greater level of detail can be provided to a manufacturing manager.

As noted in FIG. 2, an alarm indicator may be provided to alert an operator or manager of a problem with the machine tool 11. The alarm can be applied to a trend line, such as the trend line shown in FIG. 6. As shown in FIG. 6, the trend line is generally increasing over time. This may be an indication that certain components of the machine tool 11 are becoming worn. An alarm could then be applied to the trend line as an upper limit, so that if the trend line exceeded the alarm condition the indicator would provide notice. The alarm condition could be set so that a single data point exceeding the alarm condition would set off the indicator. Alternatively, the alarm condition could be set such that it would take a number of data points, or a number of concurrent data points, exceeding the alarm condition to set off the indicator.

In addition to gathering information from within an operation cycle, the present invention also contemplates gathering information outside of an operation cycle. Thus, when the machine tool 11 is idling, or otherwise moving without a cutting tool, the vibration sensor 20 and the PLC 28 may still be used to provide data to the processing unit 22. Information from the PLC 28 would indicate when the machine tool 11 is outside of an operation cycle, so that this data could be associated with the vibration data collected during this time to define an out-of-cycle data profile.

The algorithm could then be applied to this out-of-cycle data profile to generate a corresponding out-of-cycle data point. A collection of these data points could then be plotted in a trend line, such as the trend line shown in FIG. 6. Just as with the other non-machining data, an alarm condition could be set for the out-of-cycle data, so that an indicator would alert an operator or manager if the parametric representation of the vibration data exceeded some predetermined alarm condition.

Using the output from the sensor 20 and the PLC 28, the maximum vibration amplitude value can be collected and analyzed at a first predetermined frequency, for example, every 12 milliseconds. One maximum amplitude value can then archived at a second predetermined frequency, for example, every hour. This regular analysis will likely capture both machining and non-machining data, and can be used to detect crashes in the machine tool 11. As used herein, a "crash" is defined as any event that causes a vibration at the sensor 20 that is greater than a predefined limit value.

The predefined limit value can be changed for different types of machine applications. Crash detection is an overall absolute alarm limit in vibration amplitudes—e.g., measured in multiples of the acceleration due to gravity (g's). It can be active over some time interval, for example, whenever the machine tool 11 is on, or during some shorter time interval. It can be used to collect data in a continuous, real time fashion, regardless of what the machine tool 11 doing. Thus, the present invention not only provides a method for determining the health of particular components of a machine tool, but also provides a method for detecting crashes before they occur. This type of preventive maintenance can lead to significant savings, both in terms of equipment, and downtime.

While the best mode for carrying out the invention has been described in detail, those familiar with the art to which this invention relates will recognize various alternative designs and embodiments for practicing the invention as defined by the following claims.

What is claimed is:

1. A method for managing machine tool data, the machine tool being operable to perform at least one operation cycle which includes at least one machining operation and at least one non-machining operation, the machine tool having at least one sensor operatively connected thereto for sensing a machine operation parameter, and a controller configured to output data related to the at least one operation cycle, the method comprising:

operating the machine tool to perform at least a portion of an operation cycle which includes a non-machining operation;

processing data from signals output from the at least one sensor and from the controller to define a non-machining operation-specific data profile for the non-machining operation;

applying an algorithm to the non-machining operation-specific data profile to generate a non-machining operation-specific data point, thereby facilitating generation of a non-machining operation-specific trend line;

determining at a first predetermined frequency a maximum value of the machine operation parameter from the signals output from the at least one sensor;

storing the maximum value of the determined machine operation parameter at a second predetermined frequency; and comparing the stored maximum values to a predetermined limit value.

2. The method of claim 1, further comprising:

operating the machine tool to perform at least a portion of at least one operation cycle including a plurality of non-machining operations;

processing data from signals output from the at least one sensor and from the controller to define a corresponding non-machining operation-specific data profile for at least some of the non-machining operations, thereby facilitating generation of a plurality of non-machining operation-specific data points when the algorithm is applied; and plotting at least some of the non-machining operation-specific data points to generate a non-machining operation-specific trend line.

3. The method of claim 2, wherein the non-machining operations include a certain non-machining operation performed more than once, thereby facilitating generation of a plurality of non-machining operation-specific data points for the certain non-machining operation, and wherein plotting at least some of the non-machining operation-specific data points includes plotting at least some of the data points for the certain non-machining operation together, thereby generating a non-machining operation-specific trend line for the certain non-machining operation.

4. The method of claim 3, further comprising:
determining an alarm condition for the certain non-machining operation;
applying the alarm condition to the non-machining operation-specific trend line; and
indicating the alarm condition when the non-machining operation-specific trend line reaches the alarm condition.

5. The method of claim 2, the machine tool including a spindle, and wherein the non-machining operations include a spindle acceleration, a spindle deceleration, or both.

6. The method of claim 1, wherein the at least one sensor is configured to sense at least one of vibrations, current, temperature, torque or speed.

7. The method of claim 1, wherein operating the machine tool to perform at least a portion of an operation cycle includes performing first and second machining operations with a first cutting tool, and wherein the at least one non-machining operation includes operating the machine tool between the first and second machining operations.

8. The method of claim 1, wherein operating the machine tool to perform at least a portion of an operation cycle includes operating the machine tool with at least a first and second cutting tool to perform respective machining operations, and wherein the at least one non-machining operation includes changing the cutting tool from the first cutting tool to the second cutting tool.

9. The method of claim 1, further comprising:
operating the machine tool outside of an operation cycle;
processing data from signals output from the at least one sensor and from the controller to define at least one out-of-cycle data profile; and
applying the algorithm to the at least one out-of-cycle data profile to generate a corresponding out-of-cycle data point.

10. The method of claim 1, wherein applying the algorithm to the non-machining operation-specific data profile includes generating a parametric representation of the non-machining operation-specific data profile, the parametric representation including at least one of a maximum, a minimum, an average, an average root mean square, a maximum root mean square, a minimum root mean square, a root mean square summation, a kurtosis, a kurtosis average, a kurtosis maximum, a kurtosis minimum, a kurtosis standard deviation.

11. A method for managing machine tool data, the machine tool being operable to perform at least one operation cycle which includes at least one machining operation and at least one non-machining operation, the machine tool having at least one sensor operatively connected thereto for sensing a machine operation parameter, and a controller configured to output data related to the at least one operation cycle, the method comprising:
sensing a machine operation parameter for the machine tool for at least a portion of at least one operation cycle including a plurality of a non-machining operations, the machine operation parameter for the machine tool being continuously sensed over some time interval;
storing data related to the sensed parameter;
storing data from signals output from the controller;
associating the data from the sensor with the data from the controller, thereby defining corresponding non-machining operation-specific data profiles for at least some of the non-machining operations;
applying an algorithm to at least some of the non-machining operation-specific data profiles to generate corresponding non-machining operation-specific data points;
storing the non-machining operation-specific data points, thereby facilitating subsequent retrieval;
determining a maximum value of the machine operation parameter at a first predetermined frequency;
storing the maximum value of the determined machine operation parameter at a second predetermined frequency; and
comparing the stored maximum values to a predetermined limit value.

12. The method of claim 11, the machine tool including a spindle, and wherein the non-machining operations include a spindle acceleration, a spindle deceleration, or both.

13. The method of claim 11, further comprising:
retrieving at least some of the non-machining operation-specific data points; and
plotting at least some of the retrieved non-machining operation-specific data points to create a non-machining operation-specific trend line.

14. The method of claim 13, wherein the non-machining operations include a certain non-machining operation performed more than once, thereby facilitating generation of a plurality of non-machining operation-specific data points for the certain non-machining operation, and
wherein plotting at least some of the retrieved non-machining operation-specific data points includes plotting at least some of the data points for the certain non-machining operation together, thereby generating a non-machining operation-specific trend line for the certain non-machining operation.

15. The method of claim 11, wherein sensing a machine operation parameter for the machine tool includes sensing at least one of vibrations, current, temperature, torque or speed for the machine tool.

16. The method of claim 11, wherein the at least a portion of at least one operation cycle further includes first and second machining operations performed with a first cutting tool to perform respective machining operations, and wherein the non-machining operations include a non-machining operation between the first and second machining operations.

17. The method of claim 11, wherein the at least a portion of at least one operation cycle further includes respective machining operations performed with at least a first and second cutting tools, and wherein the non-machining operations include changing the cutting tool from the first cutting tool to the second cutting tool.

18. The method of claim 11, further comprising:
sensing an out-of-cycle machine operation parameter for the machine tool when the machine tool is operating outside of an operation cycle;
storing data related to the sensed out-of-cycle machine operation parameter;
associating the out-of-cycle data with the data from the controller, thereby defining at least one out-of-cycle data profile;
applying the algorithm to the at least one out-of-cycle data profile to generate a corresponding out-of-cycle data point; and storing the at least one out-of-cycle data point, thereby facilitating subsequent retrieval.

19. A method for managing machine tool data, the machine tool having a controller operatively connected thereto for outputting data related to operation of the machine tool, the method comprising:

performing at least one machining operation;

performing at least one non-machining operation;

sensing a machine operation parameter for the machine tool when it is performing the at least one machining operation and the at least one non-machining operation, the machine operation parameter for the machine tool being continuously sensed over some time interval;

associating the sensed machine operation parameter with data output from the controller, thereby defining corresponding machining operation-specific data profiles and non-machining operation-specific data profiles;

applying an algorithm to at least some of the associated data to generate corresponding machining operation-specific data points and non-machining operation-specific data points, thereby facilitating generation of machining operation-specific trend lines and non-machining operation-specific trend lines;

determining a maximum value of the machine operation parameter at a first predetermined frequency;

storing the maximum value of the determined machine operation parameter at a second predetermined frequency; and comparing the stored maximum values to a predetermined limit value.

20. The method of claim 19, the machine tool including a spindle, and wherein performing at least one non-machining operation includes accelerating the spindle, decelerating the spindle, or both.

\* \* \* \* \*